(No Model.) 7 Sheets—Sheet 2.
J. J. LEVI.
BRICK MAKING MACHINE.
No. 579,714. Patented Mar. 30, 1897.
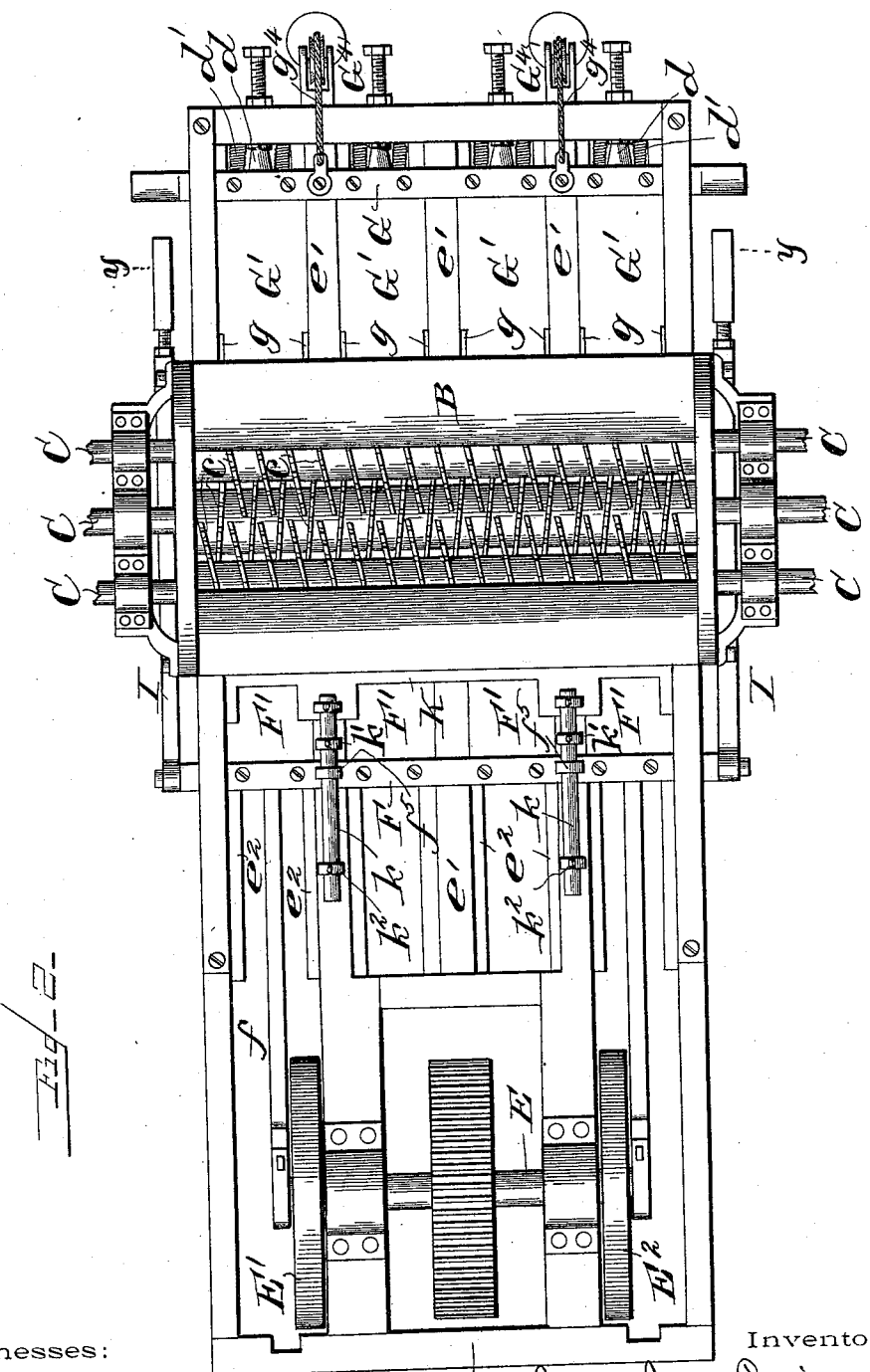

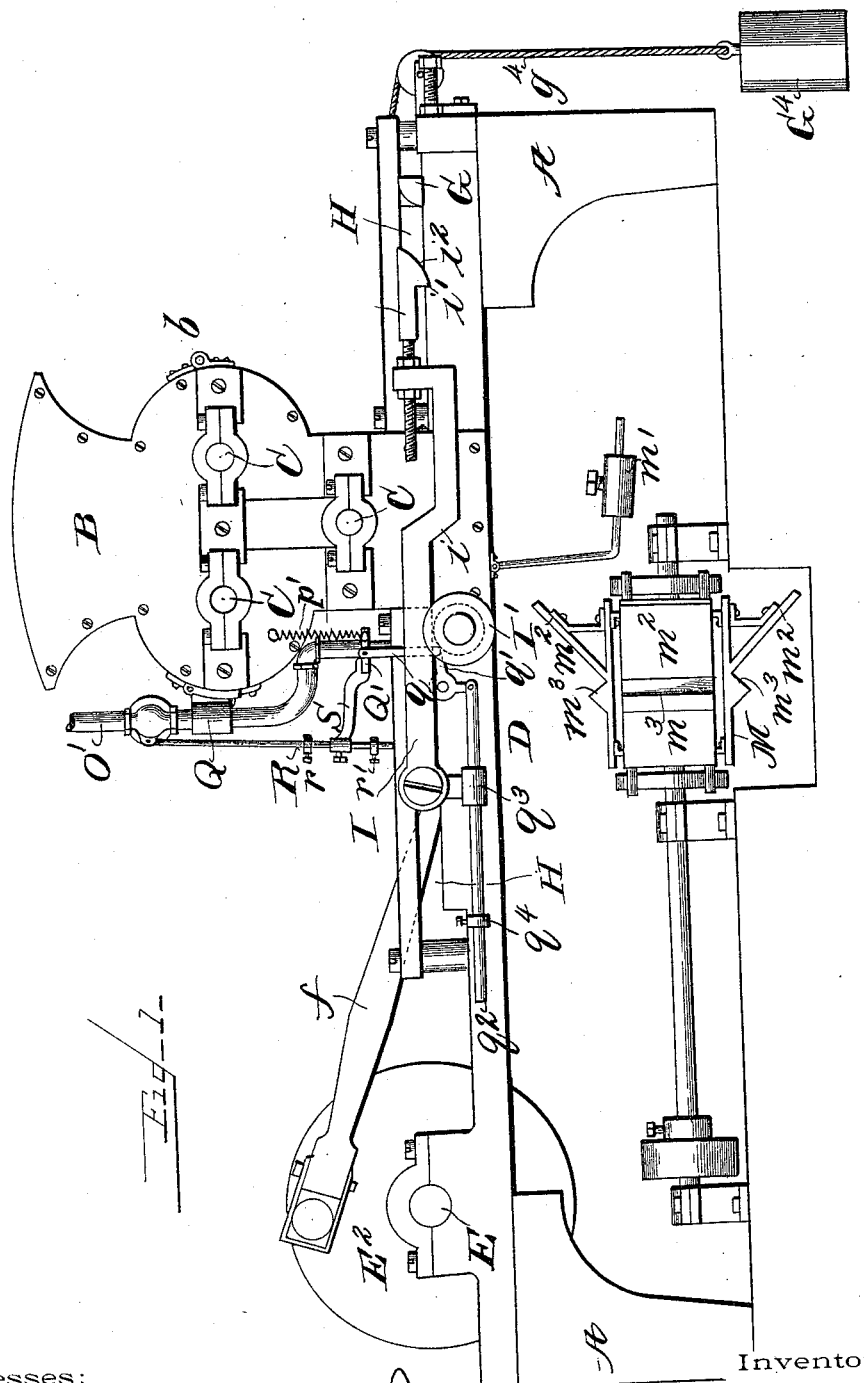

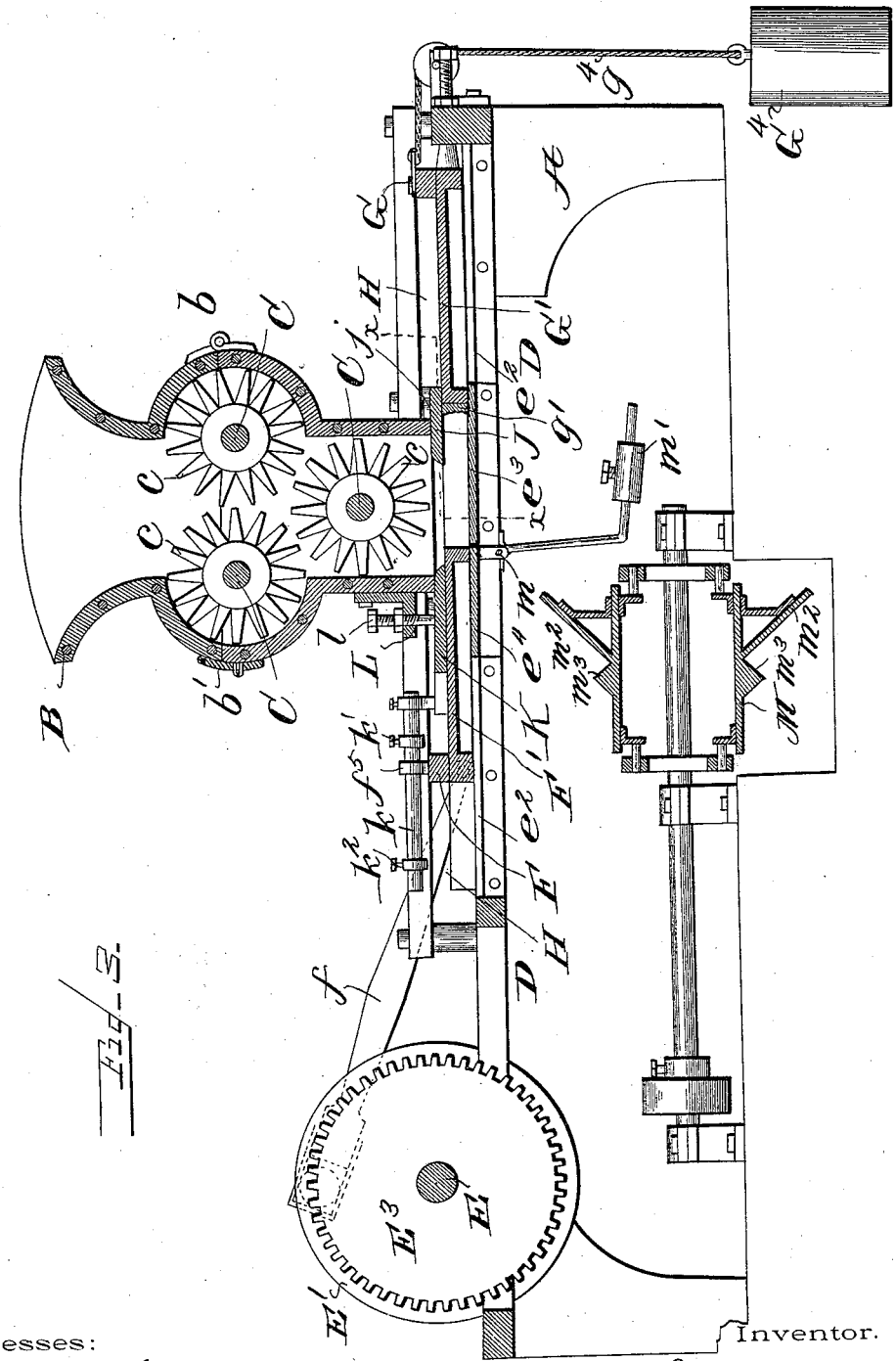

(No Model.) 7 Sheets—Sheet 4.
J. J. LEVI.
BRICK MAKING MACHINE.
No. 579,714. Patented Mar. 30, 1897.
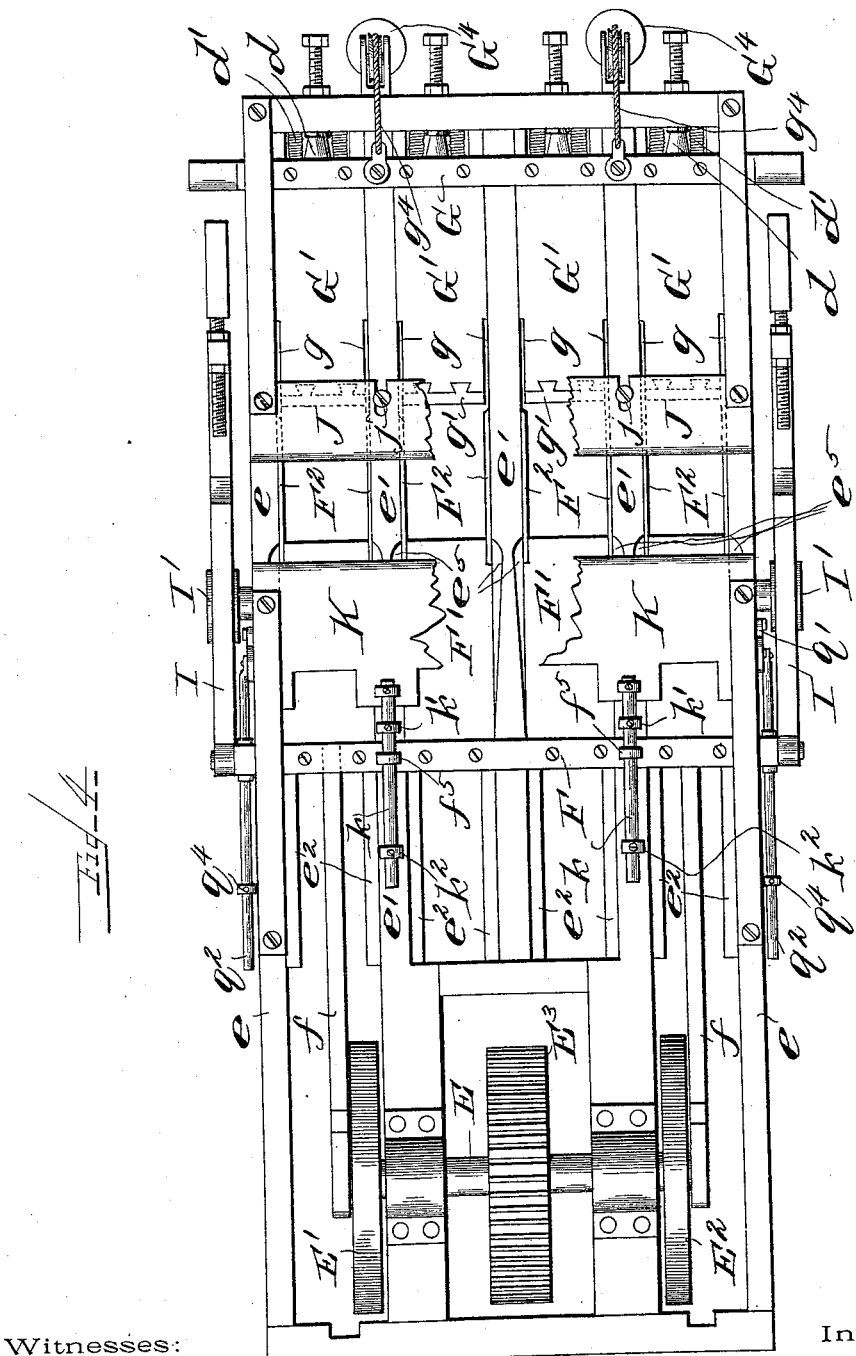

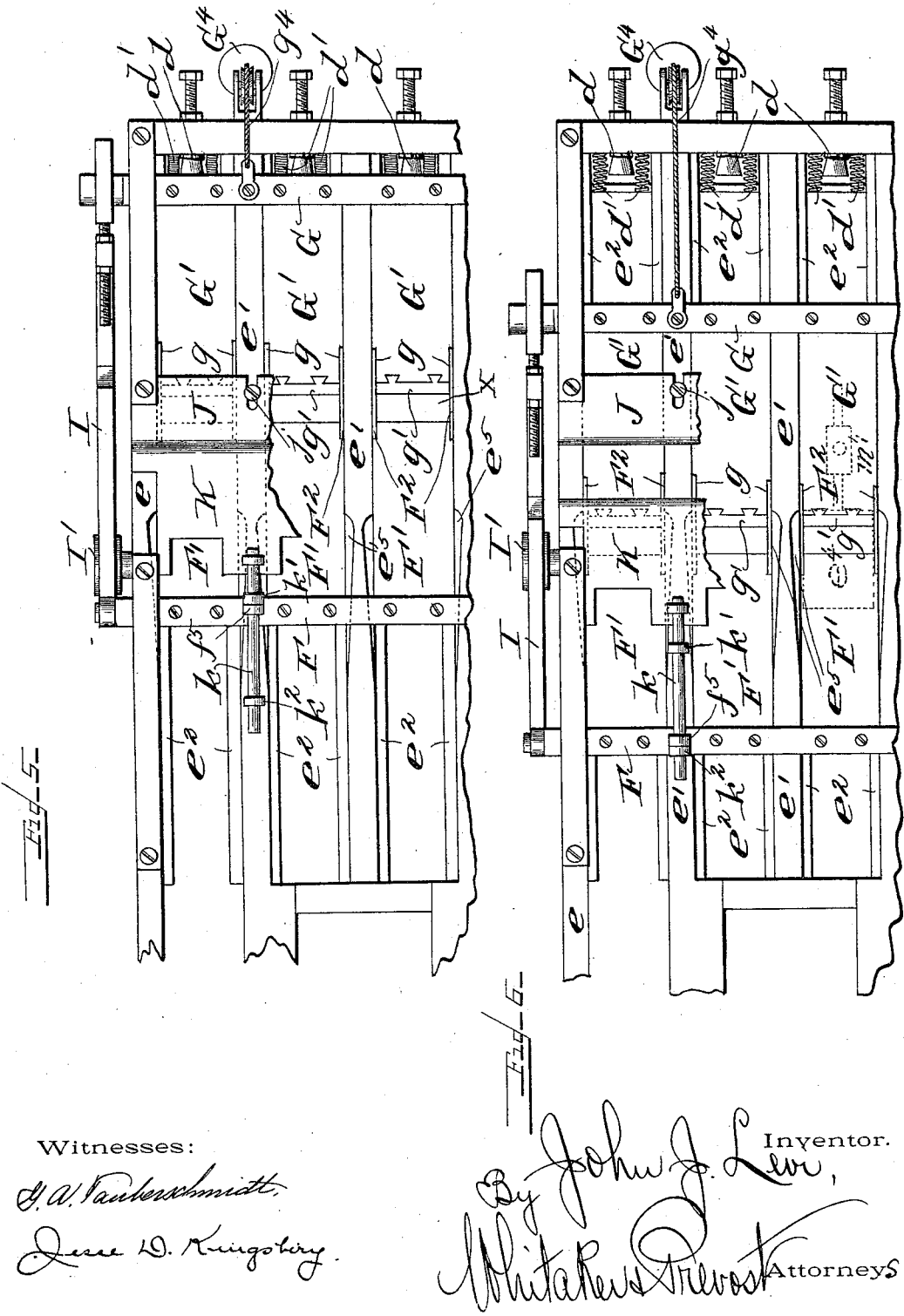

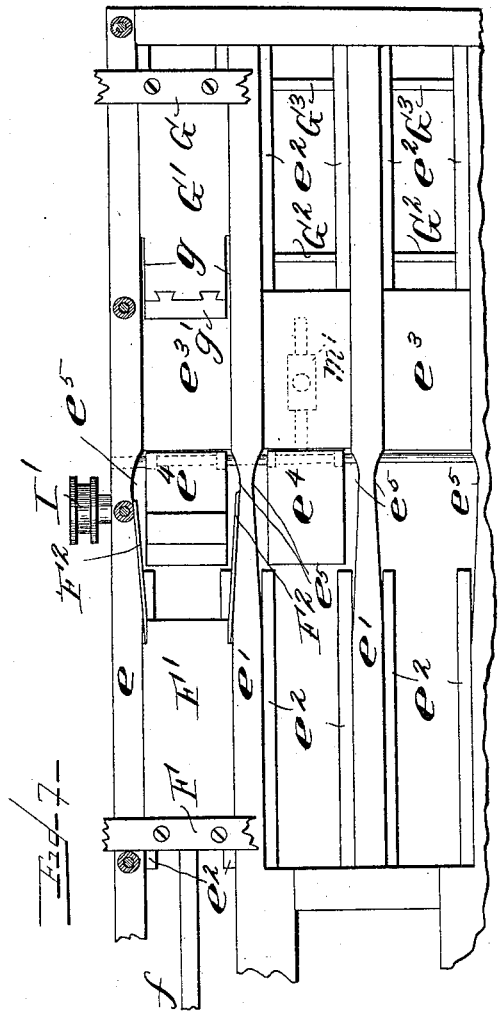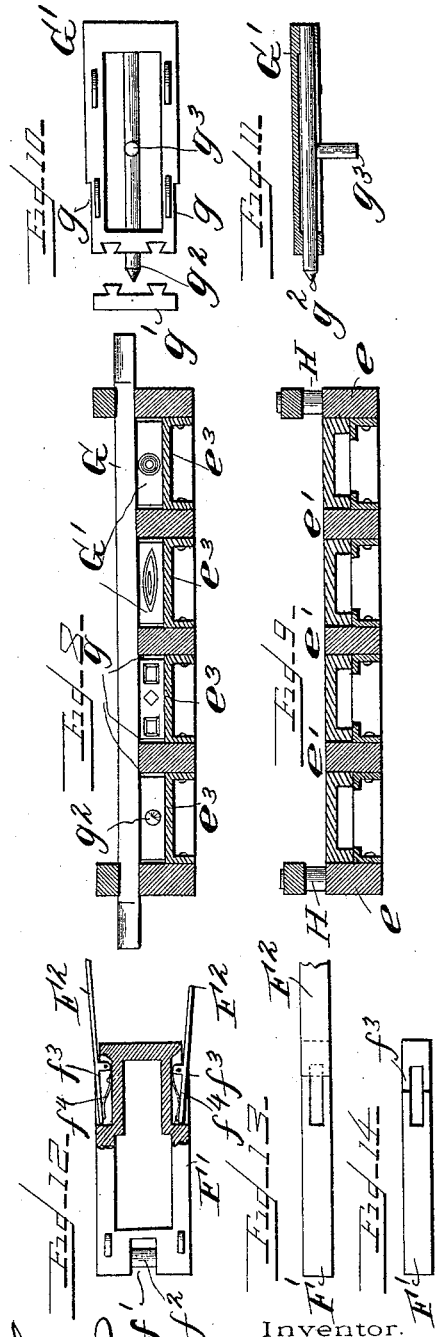

(No Model.) 7 Sheets—Sheet 7.

J. J. LEVI.
BRICK MAKING MACHINE.

No. 579,714. Patented Mar. 30, 1897.

Witnesses
G. A. Tauberschmidt.
June D. Kingsbury.

Inventor
By John J. Levi
Whitaker & Prevost
Attorneys.

THE NORRIS PETERS CO., PHOTO-LITHO., WASHINGTON, D. C.

UNITED STATES PATENT OFFICE.

JOHN J. LEVI, OF NEW RICHMOND, OHIO, ASSIGNOR OF THREE-FOURTHS TO ALFRED A. LEVI AND JOHN JAMES LEVI, JR., OF SAME PLACE, AND H. M. DALTON, OF CINCINNATI, OHIO.

BRICK-MAKING MACHINE.

SPECIFICATION forming part of Letters Patent No. 579,714, dated March 30, 1897.

Application filed April 19, 1894. Serial No. 508,122. (No model.)

*To all whom it may concern:*

Be it known that I, JOHN J. LEVI, a citizen of the United States, residing at New Richmond, in the county of Clermont and State of Ohio, have invented certain new and useful Improvements in Brick-Making Machines; and I do hereby declare the following to be a full, clear, and exact description of the invention, such as will enable others skilled in the art to which it appertains to make and use the same.

My present invention is an improved brick-making machine in which are comprised three main groups or combinations of devices. The first of these groups consists of the peculiarly-constructed hopper with grinding and mixing of the clay and delivering the material for bricks to the molds. The second consists of novel and peculiar means for forming the brick, which include means for distributing oil and sand on the surfaces of the molds to prevent the brick material from sticking to them, and, third, delivery devices.

Figure 16:
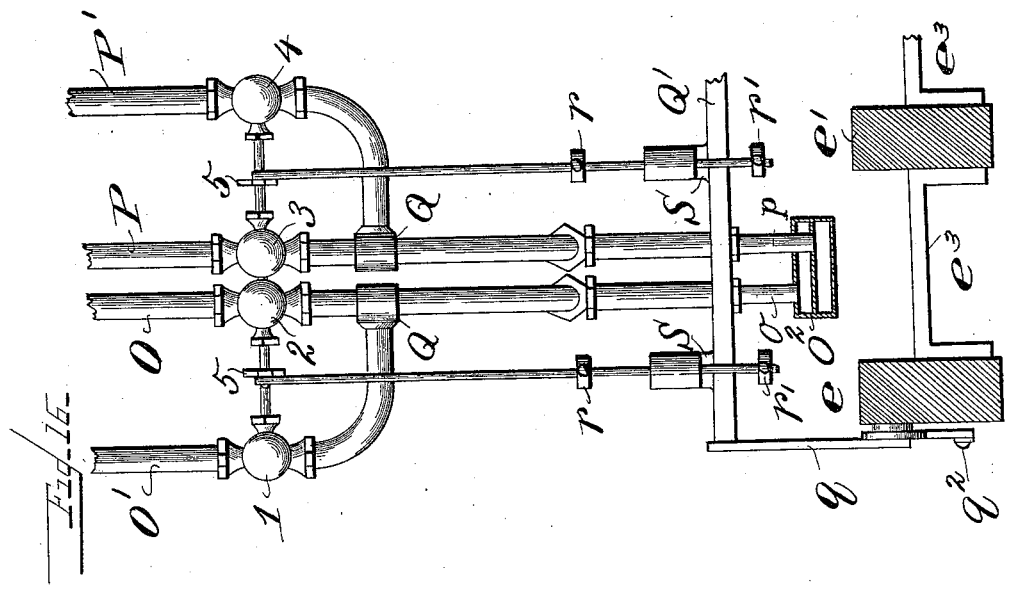
Figure 15:
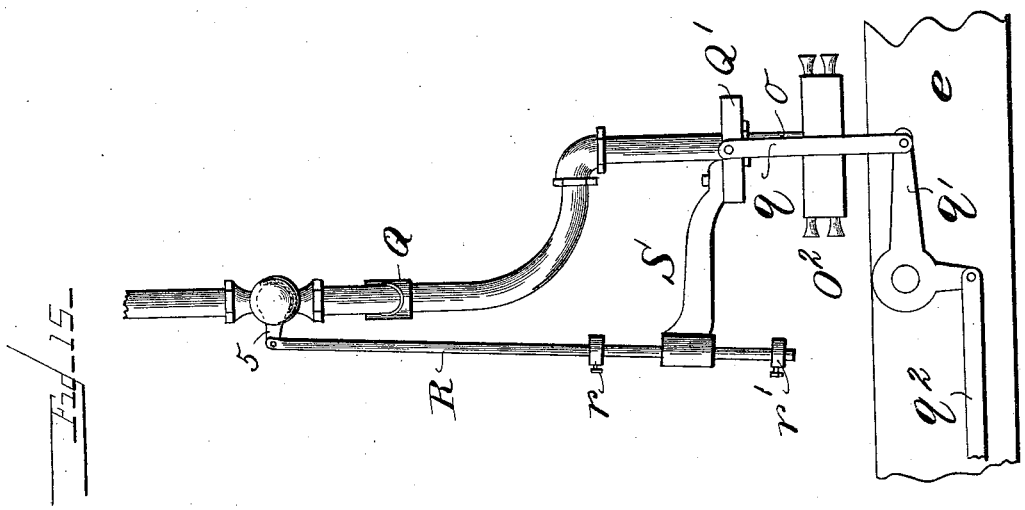

In the accompanying drawings, Figure 1 is a side elevation of a brick-machine embodying my improvements. Fig. 2 is a top plan view. Fig. 3 is a longitudinal section. Fig. 4 is a like view with the hopper and grinding devices and sanding means removed, some parts being broken away to show features of construction of devices lying beneath them. Figs. 5, 6, and 7 are partial plan views of parts shown in Fig. 4. Fig. 8 is a transverse section of the bed of the machine, taken on dotted line $xx$, Fig. 3. Fig. 9 is a transverse section of the bed of the machine, taken on dotted line $yy$ of Fig. 2. Fig. 10 is an under side view of one rear molding-slide. Fig. 11 is a longitudinal section of the same. Fig. 12 is an under side view of the front molding-slide with parts in section. Fig. 13 is a side elevation of the same with the pivoted mold ends broken away, and Fig. 14 is a like view of the same with the pivoted mold ends removed. Figs. 15 and 16 are front and side elevations of the oiling and sanding devices separated from the other parts.

The three groups of devices which constitute my brick-making machine may be mounted upon a single frame or base or upon two or more.

In the drawings I have shown the first two groups as mounted upon a single supporting-frame and the third upon another, and the delivery devices are independently supported beneath it.

In the drawings, A is the frame for supporting the grinding and mixing and brick-forming machinery.

B is the hopper, which includes the casing of the grinding and mixing devices, the latter consisting of one or more shafts C, (three being shown in the drawings,) provided with staggered saws $c$, disposed at equal intervals along the same within the hopper and casing. This casing is made in two parts, hinged together on one side, as at $b$, and on the opposite side is provided with one or more securing devices $b'$.

Beneath the grinding devices and their inclosing casing is the bed of the machine, which consists mainly of a strong open framework D. This frame is made to accommodate the main driving mechanism, which consists in this instance of the shaft E, carrying two crank-disks $E'$ $E^2$. The shaft receives motion from some suitable source communicated to it through proper intermediate gearing engaging with the wheel $E^3$. The frame is also made to accommodate as many molds side by side transversely of the bed as it is desired to make brick at one time or at each revolution of the shaft. The brick are compressed between the adjacent ends of molding-slides and the frame is provided with guideways for these slides. These guideways are in this instance formed by the sides $e$ of the frame and the intermediate pieces $e'$, extending longitudinally of the frame. The sides of these guideways are at front and rear of the machine provided with flanges $e^2$ $e^2$, (see Figs. 4, 5, 6, 7, and 8,) upon which the molding-slides rest. They are placed a distance below the top of the slides equal to the thickness of the slides themselves. Intermediate the inner ends of these flanges in each guideway is placed a closed bottom formed of a stationary table $e^3$ and a dumping-table $e^4$. (See Fig. 7.) The upper faces of these tables are flush with the upper faces of the supporting-flanges $e^2$, so that the molding-slides can move upon them, the stationary tables forming a part of the molds and the supporting means for the said slides. These stationary tables extend, preferably, from a little to the rear of the rear side of the hopper to nearly or quite across the delivery opening or passage of the hopper.

Extending entirely across the front part of the frame is a cross-piece or cross-head F. (See Figs. 4, 5, and 6.) This cross-head is given a reciprocating motion from the crank-pins of the crank-disks E' E$^2$ by pitmen $f f$. To this cross-head F are secured in any preferred manner the front molding-slides F'. These slides fit closely in the guideways hereinbefore referred to and are constructed in the manner more particularly illustrated in Figs. 12, 13, and 14. They are formed with a solid unbroken top and at the rear have a square plain end which forms one of the sides of the mold in which the brick is shaped and pressed. The slide on its under side is recessed to reduce weight and is provided with rollers to engage the supporting-ledges.

The pitmen $f$ may be connected directly to the cross-head or they may be indirectly connected therewith, as shown in the drawings, by pivoting them to two of the molding-slides. To enable this to be done, the slide is provided with a recess or mortise $f'$ and the pitman secured in such recess by the pin or pivot $f^2$.

The rear end of the slide is reduced in size and provided with recesses $f^3$ at each side, in which are pivoted the folding mold ends F$^2$. Springs $f^4$ are provided, which tend to retract the forward ends of the folding mold ends into the recesses and hold the rear ends outward and away from the mold-slide, but permitting the said rear ends to be forced or folded inward upon the main body of the slide. Each guideway is provided on each side with an enlargement or recess $e^5$ (see Fig. 7) to permit these folding mold ends to spread apart and away from the main mold-body, and the forward ends of such recesses are rounded or inclined to force the same inward upon the main body of the molding-slide as the slide moves rearwardly.

The rear molding-slides G' (see Figs. 10 and 11) are secured to a cross-bar or cross-head G. These slides are constructed in much the same manner as the front slides, except that they are cut away or recessed at their front ends at $g$ to receive the folding mold ends. When it is desired to give the brick some special form or construction, they are on their front ends dovetailed to receive a face-die $g'$ of the form desired. I have shown this means of securing the die to the slide; but other means may be used, if preferred. When it is desired to perforate the brick, I employ a perforator $g^2$, as shown in the drawings, Fig. 11. This is preferably movably mounted in the main body of the slide and has the pin or arm $g^3$ extending downwardly from it. The main frame is provided with the perforator-stops G$^2$ and G$^3$, (see Fig. 7,) which are in the path of the downwardly-extending pin or arm $g^3$ of the perforator. When the slide is in its normal position, the pin $g^3$ rests against the rear stop G$^3$ and the perforator extends beyond the face of the slide, as shown in Figs. 10 and 11. When the slide is drawn forward prior to discharging the brick, the pin $g^3$ of the perforator will engage the forward stop G$^2$ and stop the movement of the perforator while the slide moves on, this withdrawing the perforator from the brick.

To the cross-head G is secured one or more cords or ropes $g^4$, which pass rearwardly over pulleys on the rear end of the frame and have weights G$^4$ secured to them, which serve to keep the rear molding-slides G' in their most rearwardly position unless moved therefrom by the means provided for that purpose. The rear of the frame is provided with the abutments $d$, one for each rear molding-slide, and against which such slides are pressed and held in making the bricks. These abutments are adjustably secured to the frame to regulate the position of the rear molding-slides at the time of forming the bricks and thereby regulate the thickness of the same. On each side of the abutments I preferably place buffer-springs $d'$ to receive and check the motion of the rear molding-slides in their backward movement.

The cross-bars or cross-heads F and G extend beyond the sides of the main frame, passing through guideways H H on each side of the machine. To the outer ends of the cross-head F are secured the drag-bars I I, one at each side of the machine. These bars are pivoted to the cross-head F and rest on the flanged supporting-rolls I' I'. Midway of their length the drag-bars I are provided with a cam-face $i$ and at their rear ends with hooks $i'$. These hooks are preferably secured to the bars to permit adjustment. The rear ends of the hooks have an upwardly curving or inclining face $i^2$ and the outer ends of the cross-head G are reversely curved or inclined to permit the hooks on their rearward movement to be raised when coming in contact with said bar. As soon as the hooks pass beyond the end of the cross-bar or cross-head they will fall by gravity, so that the reverse movement of the bars will carry the cross-head G and the rear molding-slide forward with them.

The rear molding-slides when in their most rearward position rest upon the rear edges of the stationary tables $e^3$. Immediately above them is the plate J, which forms the top of the mold in which the brick is formed. This plate extends forwardly under the hopper-casing and can be adjusted backward and forward to regulate the size of the delivery-passage of the hopper as desired. This adjustment is secured in this instance by bolts $j$, passing downward through the frame and engaging slots in the plate J.

On the opposite side of the hopper from the plate J is the cut-off plate or slide K. This plate slides upon the top of the walls of the molding-slide guideways. To this slide K are secured in any suitable manner two rods $k$, which pass through eyes $f^5$ on the cross-head F. On these rods $k$ are two collars $k'$ and $k^2$, adjustably secured thereto by set-screws. These collars are set upon the rods $k$ so that on the forward movement of the cross-head F and the molding-slides the slide K will at the proper moment be drawn with it to let a fresh charge of the material in the hopper fall upon the tables $e^3$ between the guideways and on the return movement of the cross-head will be forced rearward to close the discharge-passage of the hopper. The adjustment of the collars $k^2$ regulates the distance that the slide K will be moved and consequently the amount of material permitted to fall upon the tables. At the front side of the hopper-casing are two brackets L, through which two screws $l$ pass and bear on the top of slide K to give sufficient friction, so that the slide will not move until the collars $k^2$ are struck by the eyes on the cross-head F. The dumping-tables are pivoted at $m$ and are held normally in a closed position by counterbalance-weights $m'$. These weights are made adjustable, as shown, so that the tables can be made to effect their proper function with brick of different sizes and weights.

Beneath the frame of the machine is located an endless delivery-carrier M. This is mounted upon parallel shafts in the usual way, the only peculiarity of the endless carrier being in the form and construction of the separate sections of the same. Each section is provided with an inclined plate $m^2$, extending upward toward the pivoted side of the dumping-doors, so that the same shall, as nearly as possible, form a continuation of the table when tilted to a position to discharge a brick. At the foot of the inclined plate $m^2$ is an abutment $m^3$, presenting a face at about right angles to the face of the plate $m^2$, which is to receive and arrest the motion of the descending brick.

In working certain sorts of clays it is necessary to make an application of some substances to the parts forming the mold to prevent the clay from sticking to them and clogging the machine. When this is necessary, I propose to employ in connection with the devices hereinbefore described a mechanism which shall automatically sand and oil the parts of the mold to which the clay is liable to adhere. This mechanism is shown in detail in Figs. 15 and 16, the same being shown in its relation to the other parts in Fig. 1. For each guideway or each pair of front and rear molding-slides I employ the construction best shown in Fig. 16. In this figure O is a pipe connected with some device (not shown) for supplying air under pressure.

O' is a pipe connected with a sand-supply. P is a pipe connected with a steam-supply, and P' a pipe connected with a means or reservoir for supplying oil. These pipes are supported in proper position by a bracket Q, attached to the hopper-casing B. The pipes O and P extend downward to a cross-bar Q'. To this cross-bar are secured two pipes $o$ and $p$, telescoping within the pipes O and P, and to their lower ends is secured the discharge-box $O^2$. This box is divided horizontally by a partition into two parts. The pipe $p$ extends downward into the lower compartment, while the pipe $o$ extends into the upper. Each compartment is provided with a front and rear outwardly-flaring delivery-nozzle, as shown in the drawings. At each side of the machine the bar Q' is connected by a link $q$ with an arm of a bell-crank lever $q'$. A rod $q^2$ extends forwardly through an eye $q^3$, depending from the cross-head F, and the rod $q^2$ is provided with an adjustable collar $q^4$, secured in this instance to the rod by a set-screw. This collar is located at such a distance from the bell-crank lever that the cross-head F on its movement toward the front of the machine will give the rod and bell-crank lever the proper movement to depress the discharge-box $O^2$ between the front and rear molding-slides to properly oil and dust them. The return of the bar and the upward movement of the parts on the rearward movement of the bar and discharge-box is effected by the springs $p'$, of which as many are employed as will secure the proper movement of the bar. The flow of the materials employed, sand and oil, and their impelling vehicle, air and steam, is controlled by four valves 1, 2, 3, and 4, two of which are connected with and operated by a single rock-shaft. An arm 5 extends from each of these shafts toward the front of the machine, and with this is connected a rod R, which extends downwardly, passing through the eye of an arm S, rigidly secured to the bar Q'. Two collars $r$ and $r'$ are adjustably secured to the rod R, above and below the bar S, so that the movements of the valves can be timed to secure the results desired.

The operation of the machine will be easily understood by persons familiar with the art. Supposing the front molding-slides in their position nearest the front of the machine. When in this position, the pivoted end molds are opened outward and lie in the recesses $e^5$ of the guideways, as shown in Fig. 7. The slide K having been drawn forward, a fresh supply of material has been dropped into the guideways. On the molding-slides starting on their rearward movement the pivoted mold ends come in contact with the inclined ends of the recesses and are forced inward against the body of the mold. The springs $f^4$ serve to hold these mold ends against the sides of the guideways and the parts of the brick-forming mechanism assume the position shown in Fig. 4. The springs $f^4$ also serve by keeping the mold ends against the sides of the guideway to insure those devices entering the recesses $g$ at the sides of the rear molding-slides, as the front molding-slide is forced farther backward toward them. In this further backward movement the eyes $f^5$ come in contact with the collars $k'$ and force the cut-off slide K rearward to the position shown in Fig. 5, first closing the delivery-passage of the hopper and then pressing the brick, which is shown at $x$ in said figure. In this movement the hooks of the drag-bars I have passed over the ends of the cross-head G. On the return movement of the front molding-slides and the cross-head F the drag-bars, by reason of the engagement of the hooks $i'$ with the cross-head G, both slides are drawn forward together until the brick has been brought forward in proper position upon the dumping-tables. At this point the inclines $i$ of the drag-bars I come in contact with the rollers I', the drag-bars are raised to cause the hooks to release the cross-head G, and the rear molding-slides and cross-head G are drawn back to their normal position by the weights $G^4$. A slight further forward movement of the slides brings the pivoted mold ends opposite the recesses $e^5$ and they are thrown outward into the said recesses, thereby releasing the brick and permitting the weight of the same to press the dumping-table down, thereby depositing the brick upon the endless carrier M beneath. In the latter part of this movement the eyes $f^5$ have engaged the collars $k^2$ and moved the cut-off slide K forward, permitting another supply of material to descend into the guideways for a repetition of the same series of movements.

When the perforator $g^2$ is employed on the rearward movement of the rear molding-slides, the arm $g^3$ is brought into contact with the rear perforator-stop $G^3$ and the perforator is thereby projected through the face of the slide. On the forward movement of the slide the arm $g^3$ comes in contact with the forward perforator-stop $G^2$ and the perforator is withdrawn from the brick before the brick reaches the dumping-table, so as to insure the release and dumping of the brick.

The removable faces of the molding-slides G enable me to make a brick having any outward configuration, as I propose, when desired, to make the faces of the front molding-slides removable and interchangeable in like manner.

Fig. 8 shows the different rear molding-slides with faces furnishing bricks of different face designs.

When on the forward movement of the molding-slides the brick has been left upon the dumping-table, the eye $q^3$ on the cross-head F comes in contact with the collar $q^4$, and through the rod $q^2$, bell-crank lever $q'$, and link $q$ depresses the discharge-box of the sander and oiler. If the brick has not been dumped by the tables, the box will strike it and discharge it. As soon as the discharge-box reaches its lowest position the valves are operated and the parts constituting the molds are oiled and sanded, and as soon as the rearward movement of the slides begins the discharge-box is raised by the springs and the valve closed. I may also provide the plate J and the tables $e^3$ with a corrugated construction and form bricks with corrugated edges. In such case there would have to be slight changes in coöperating parts, all of which would be readily apparent to a person skilled in the art.

It will be obvious that a machine of exactly the same principles of construction could be made to operate to mold and shape plain and figured tiles for roof, floor, and mantel purposes.

I have also contemplated securing the rearward movement of the rear molding-slides by other means than the weights, such as springs or air-pressure.

What I claim, and desire to secure by Letters Patent, is—

1. A grinder for a brick-machine including among its members, a plurality of parallel shafts each provided with a series of parallel circular toothed disks, disposed angularly to the shaft, the disks of each shaft being disposed at a different opposite angle to that of the disks of an adjacent shaft, the disks of one shaft registering with the space between the disks of an adjacent shaft substantially as described.

2. A brick molding and shaping machine having among its members a pair of molding-slides, a stationary table forming a part of the mold, an automatically-acting dumping-table, and means for moving the pressed brick from the stationary table onto the dumping-table, substantially as described.

3. A brick molding and shaping machine having a pair of molding-slides forming opposite sides of the molds, folding mold ends, a stationary table forming a part of the mold, an automatically-acting dumping-table, means for moving the pressed brick onto the dumping-table and means adjacent to the dumping-table for permitting the opening of the folding mold ends, substantially as described.

4. In a brick molding and shaping machine the combination with the front and rear molding-slides, of a stationary table forming a part of the mold, and a self-acting dumping-table, means for moving the slides together to bring the pressed brick onto the dumping-table, means for separating the said slides to leave the brick on the dumping-table and to move the rear slides into position on the stationary table to effect the formation of another brick, substantially as described.

5. The combination with the guideways having recesses in the side walls of the same, of the front molding-slide having folding mold ends fitting within said recesses, substantially as described.

6. The combination with the main frame having the supporting-flange, of the stationary and dumping tables, and the front and rear molding-slides, substantially as described.

7. The combination with the front and rear molding-slides, the stationary table, the dumping-table, means for holding the rear slides upon the stationary table, a single drag-bar at each side of said molding-slides to couple the same for joint movement to bring the pressed brick upon the dumping-table, substantially as described.

8. The combination with the front molding-slides of the cut-off plate and connections between them having provision for lost motion to open and close the cut-off plate by a less movement than is given the slides themselves, substantially as described.

9. The combination with the brick forming and shaping machine having a pivoted dumping-table, of an endless discharge-carrier having receiving-plates inclining toward said tables, substantially as described.

10. The endless discharge-carrier having the receiving-inclines and the arresting-abutments, substantially as described.

11. The combination with a brick-mold, of pipes for conveying air under pressure, steam, sand and oil, and discharge-nozzles for said materials movable toward and from the said mold, substantially as described.

12. The combination with a brick-mold, of pipes for conveying air under pressure, steam, sand, and oil, valves for controlling the said pipes, a box provided with discharge-nozzles connected with said pipes, said box being movable toward and from the said mold and means for controlling said valves operatively connected with said box, whereby the moving of the box into and out of operative position effects the opening and closing of said valves, substantially as described.

13. The combination with a brick-mold, of oil and sand supply pipes, of discharge-nozzles movably connected therewith, means for moving said nozzles to and from the brick-mold, substantially as described.

14. The combination with a brick-mold, of pipes for supplying air under pressure, steam, oil and sand, of a divided discharge-box, one division connected with said pipes to receive air and sand the other connected to receive oil and steam, said box being movably connected with said pipes, valves for controlling the supply of materials to each division of said box and connections between said box and valves, whereby the movement toward the said brick-mold opens said valves and the reverse movement closes them, substantially as described.

15. The combination with the divided discharge-box, of the oiler and sander and pipes for supplying sand and oil to different compartments, substantially as described.

In testimony whereof I affix my signature in presence of two witnesses.

JOHN J. LEVI.

Witnesses:
D. HER. PETTENGER,
P. M. PAYNE.